March 29, 1938.　　　L. F. ROSS　　　2,112,789
RAPID MEASURING OR SPACING GAUGE
Filed Aug. 28, 1935　　　2 Sheets-Sheet 1
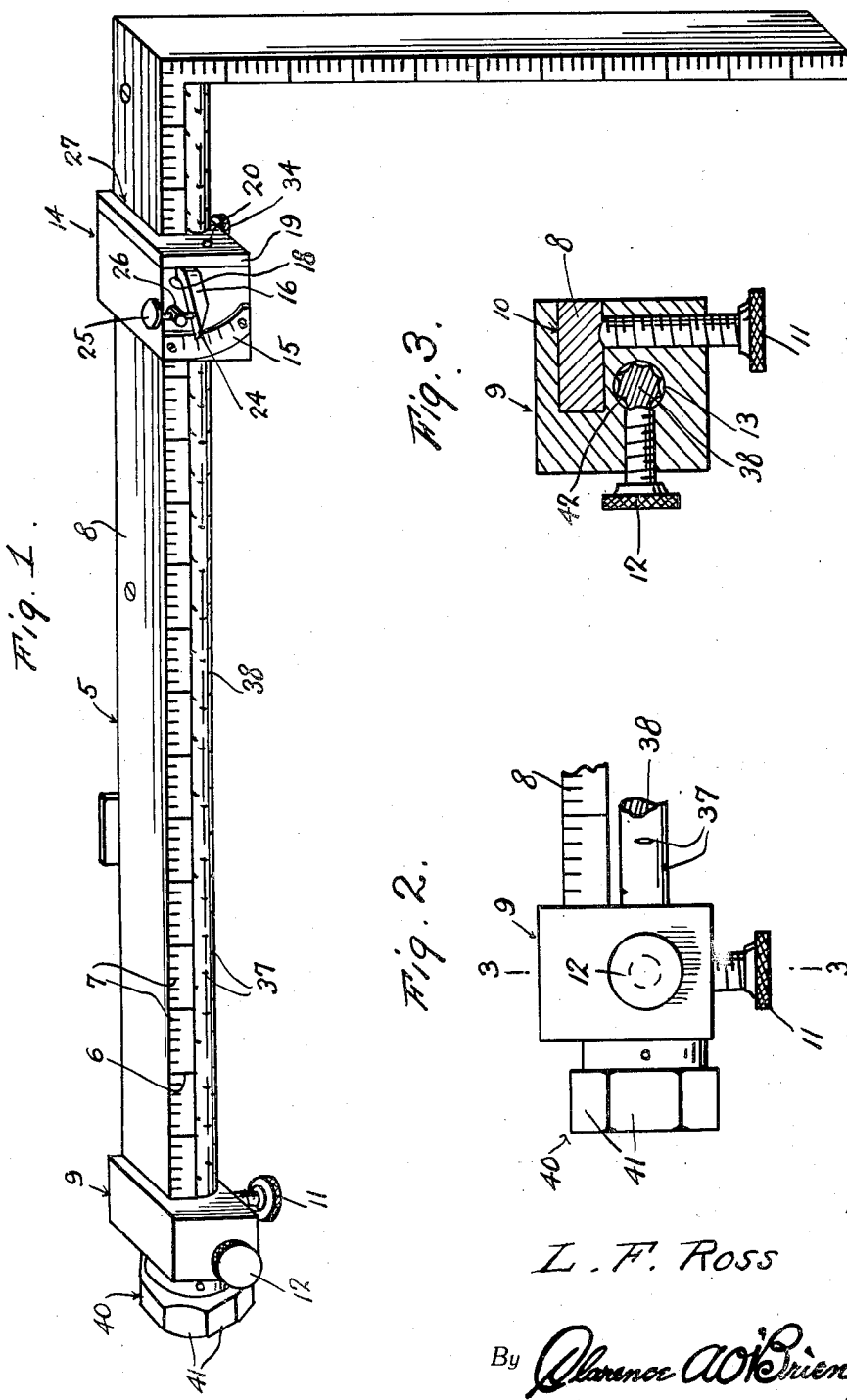

March 29, 1938. L. F. ROSS 2,112,789
RAPID MEASURING OR SPACING GAUGE
Filed Aug. 28, 1935 2 Sheets-Sheet 2
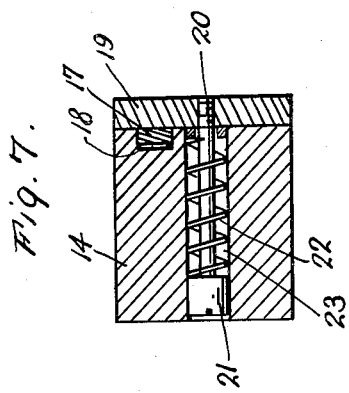
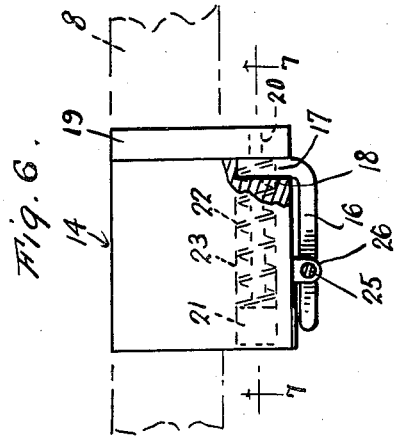
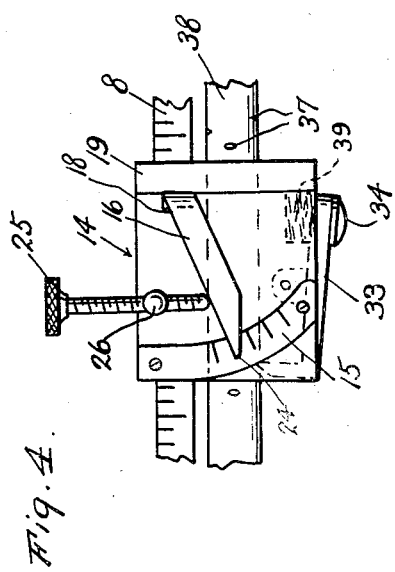
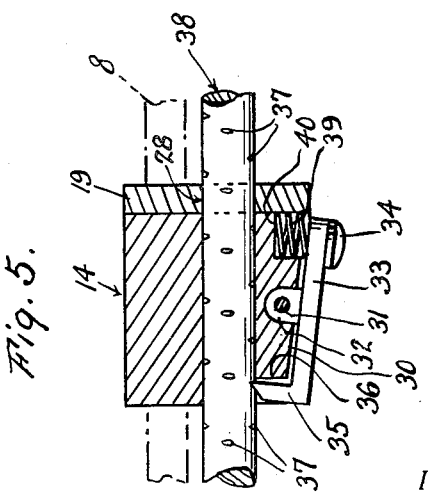
Inventor
L. F. Ross
By Clarence A. O'Brien
Attorney Patented Mar. 29, 1938

2,112,789

UNITED STATES PATENT OFFICE 2,112,789

RAPID MEASURING OR SPACING GAUGE

Louis Frederick Ross, Kansas City, Mo.

Application August 28, 1935, Serial No. 38,321

3 Claims. (Cl. 29—67)

My invention relates generally to a spacing or measuring gauge, and particularly to an instrument of this character for use on mitering machines, saw trimmers, and other machines requiring accurate measuring or spacing of materials to be mitered or cut in specified lengths, and an important object of the invention is to provide a simple and efficient device of this character, which is relatively inexpensive to manufacture.

Another important object of my invention is to provide a device of the character indicated above which is capable of being very quickly and accurately adjusted, and which is not subject to getting out of order easily.

Other important objects of my invention will be apparent from a reading of the following description in connection with the drawings, wherein for purposes of illustration I have shown a preferred embodiment of my invention.

In the drawings:—

Figure 1 is a general perspective view of the embodiment.

Figure 2 is an enlarged elevational view of the left hand end portion thereof.

Figure 3 is a transverse vertical sectional view taken through Figure 2 approximately on the line 3—3.

Figure 4 is an elevational view of the sliding block.

Figure 5 is a longitudinal vertical sectional view taken through Figure 4.

Figure 6 is a horizontal sectional view taken through a portion of Figure 4.

Figure 7 is a horizontal sectional view taken through Figure 6 approximately on the line 7—7 and looking upwardly in the direction of the arrows.

Referring in detail to the drawings, the numeral 5 generally designates the L-shaped body of the device which is generally rectangular in cross section and has on opposite edges the main graduations 6 and the sub-divisions 7 thereof.

Slidably mounted on the left hand end of the bar 8 which is the principal measuring portion of the body 5, is the block 9 which is formed in its rear face with a notch 10 which slidably receives the bar 8; a vertical set screw 11 traverses the lower part of the block and enters the opening 10 to engage the underside of the bar 8 for locking the block 9 in an adjusted position on the bar 8.

Another set screw 12 enters the front side of the block and engages in a bore 13 which traverses the block horizontally below the opening 10 and forwardly of the set screw 11. Slidable along the bar remote from the block 9 is the slide block 14 which like the block 9 is generally rectangular in form and has on its front face an arcuate scale 15 with which cooperates a pointer lever 16 which is L-shaped as indicated in Figure 6 and has a rectangular cross-section foot portion 17 arranged in an opening 18 in the right hand end of the block and engaging the inner face of a movable section 19 which is mounted on a screw 20 having a large head 21 and having circumposed thereon between the head 21 and the section 19 the retracting helical spring 22 which normally retracts the section 19 into engagement with the block 14. The head 21 slides in a bore 23 which traverses the block in a longitudinal direction. The block 14 supports and positions the end of the bar 38 opposite the block 9.

The pointer lever 16 is so arranged that it has a pointing portion 24 lying over and along the scale 15 which when the lever 16 is swung in a vertical plane will travel from one graduation to the other on the scale 15 and at the same time rotate the foot portion 17 in a manner to work the section 19 toward and away from the block 14. The pointer lever 16 is worked by means of a screw 25 which is mounted to the front face of the block 14 by a bracket 26, the lower end of the screw 25 engaging the upper edge of the longitudinally extending portion of the lever 16 as clearly shown in Figures 1 and 4.

Like the block 9 the block 14 has in its back a notch 27 slidably receiving the rectangular bar 8, and below this notch a bore 28 which slidably receives the bar 38 and is located below and to one side of the bore 23.

The bottom of the block 14 is beveled as indicated by the numeral 30 and set into an opening therein is a pivot 31 on which an ear 32 works, the latter being fastened to a latch 33 which has an operating head 34 at one end and a hook or detent 35 at the opposite end.

The detent enters an opening 36 in the left hand end of the block and engages depressions 37 in the surface of a round rod 38. A compression spring 39 sets into an opening 40 in the bottom of the block and engages the headed portion of the latch 33 to keep the detent engaged with the rod 38 whereby the block 14 is maintained in a position into which it is brought when the head of the latch is released.

The left hand end of the rod 38 has fixed for rotation therewith the knob 40 which has faces 41 on which appear suitable markings to correspond with respective longitudinal rows of the depressions 37. The depressions 37 are also in each row longitudinally spaced in a predetermined manner to correspond with the graduations 6 and 7 on the edges of the bar 8. Adjacent the head 40 the round rod 38 has longitudinally aligned with each of the rows of depressions 37 the sockets 42 with which the inner end of the screw 12 is engageable to lock the block 9 and therefore the bar 8 and the block 14 in a certain circumferential position on the bar 38 corresponding to the particular row of measuring depressions 37 chosen. In operating the device of the invention, after the screw 12 has been released, the knob or head 40 is turned until a chosen marking on the face thereof faces the operator. For instance, if spacing of two and one-half picas is desired, where the instrument is graduated in picas, the number 2½ on the face of the knob 40 is brought so as to face the operator. Then the operating block or slide block 14 is released by pressing the latch lever 33 and moving the block until the detent of the lever slips into the next calibration depression 37. Each set or row of calibrations on the rod 38 can be utilized in the same manner, so that a quick, accurate measuring of the material to be cut or mitered is capable of being achieved. As already stated, the indicia on the body 5 correspond to the calibrations on the rod 38.

If the rod 38 is returned so as to place the pica calibrations thereon to face the operator, the slide block 14 will move one pica every time it is moved forward by pressing the latch 33, or it can be moved to positions corresponding to the indicia on the body 5, and the detent portion 35 of the lever will engage the corresponding pica calibrations on the rod and hold the block in position.

On the table of the mitering machine or trimmer, such as the device of the invention is adapted to be mounted on, there is a bar for the purpose. On the "Ross all-angle rotary mitering machine" this bar is in the form shown in Figure 1 of the drawings herein and the measuring or spacing gauge is fastened by the block 9 and the screw 11, the latter passing through the block 9 below the bar 38 and coming into contact with the arm of the machine. For mounting this gauge on a saw trimmer, the same procedure is followed in general. The measuring or spacing gauge is mounted on the machine so that the bar 38 is between the operator and the arm of the machine to which the gauge is attached. This will put the slide block in such a position that the knob 34, by pressure on which the block is released to move back and forth on the bar 38, is in front of the operator. The measuring gauge does not work vertically, except that on the "Ross all-angle rotary mitering machine" it is automatically carried up and down as the table moves up and down to carry the material worked on across the cutting member. On a saw trimmer the gauge is moved back and forth to carry the material against the saw, and then moved back toward the operator after the cut has been made. The slide block 14 moves back and forth on the rod 38 to determine the length of the material to be cut.

The purpose of providing the part 19 movable with respect to the part 14 grows out of the consideration that the pica is the unit of measurement in printing. There are twelve points in a pica and six points in a half pica. The calibrations on the part 38 are spaced in exact half picas and multiples thereof. For the majority of work, the rod 18 will be set so that the half pica line of calibrations will be facing the operator so as to engage the detent 35. In cutting material to be used in setting type forms, it is frequently necessary to have smaller fractional parts of a pica than a half pica. For instance, if it is necessary to miter a piece of border 12 picas and three points in length, it is necessary to have an arrangement that will afford 12 picas plus three points, or thirteen picas less nine points. Therefore, the slide block 14 is set at the 12½ pica mark on the arm of the machine, and the screw 25 is then turned clockwise far enough to move the lever 16 up three points on the scale 15, which results in moving the part 19 three points away from the block 14. This affords a length of 12 picas and three points. By turning the screw 25 clockwise and moving the part 16 forwardly on the scale 15, the spring 22 is depressed, because the bolt 21 moves forwardly through the bore 23, the head of the bolt depressing the spring. When the screw 25 is turned counterclockwise and returns the part 16 to its normal or initial position on the scale 15, the spring 22 expands and pushes the screw 21 back through the bore 23 to its normal or initial position, thereby bringing the part 19 into close contact with the block 14.

Although the measuring or spacing device shown and described herein is designed primarily for use on the Ross all-angle rotary mitering machine, it is adapted to be used on saw trimmers or as a spacing or measuring device on any machine used in printing. This mitering machine is covered by Patent No. 2,049,176 granted to me on July 28, 1936. The device may be made in any suitable size and the calibrations made in inches or feet instead of in picas or in other calibrations for use on machines employed in any line of work which requires a quickly operated spacing or measuring device.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A rapid measuring gauge of the character described comprising a bar having a slide thereon, a block mounted on the bar, said slide and said block having registering bores, a round rod traversing said bores and lying alongside of said bar, longitudinally and circumferentially spaced indentations in said round rod corresponding to predetermined linear units of measurement, said rod being rotatable for selecting a longitudinal row of calibration indentations on the rod, and means on the slide for engaging in a selected indentation for holding the slide in a longitudinally adjusted position.

2. A rapid measuring gauge of the character described comprising a bar having a slide thereon, a block mounted on the bar, said slide and said block having registering bores, a round rod traversing said bores and lying alongside of said bar, longitudinally and circumferentially spaced indentations in said round rod corresponding to predetermined linear units of measurement, said rod being rotatable for selecting a longitudinal row of calibration indentations on the rod, and means on the slide for engaging in a selected indentation for holding the slide in adjusted position, and means on said block for engaging sockets formed in said rod and longitudinally aligned with the rows of calibrations on the rod for locking said rod in the desired position of rotation corresponding with the selected row of indentations on the rod.

3. A rapid measuring gauge of the character described comprising a bar having a slide thereon, a block mounted on the bar, said slide and said block having registering bores, a round rod traversing said bores and lying alongside of said bar, longitudinally and circumferentially spaced indentations in said round rod corresponding to predetermined linear units of measurement, said rod being rotatable for selecting a longitudinal row of indentations on said rod, means on the slide for engaging in a selected indentation for holding the slide in adjusted position, and means on said block for engaging sockets formed in said rod and longitudinally aligned with the rows of indentations on the rod for locking said rod in a position of rotation corresponding with the selected row of indentations on the rod, said slide including a section extensible to define fractional measurements of the graduations of any of the rows of indentations on the rod, and means on the slide for operating said section.

LOUIS F. ROSS.